United States Patent [19]
McIlvenna

[11] Patent Number: 6,076,978
[45] Date of Patent: Jun. 20, 2000

[54] REMOTE PHOTOGRAPHY DEVICE

[76] Inventor: Kevin Lee McIlvenna, 5146 Twincreek, Antioch, Calif. 94509

[21] Appl. No.: 09/130,906

[22] Filed: Aug. 7, 1998

[51] Int. Cl.[7] .................................................. G03B 17/00
[52] U.S. Cl. ............................................................. 396/425
[58] Field of Search ................................... 396/419, 420, 396/424, 425, 426, 427, 504

[56] References Cited

U.S. PATENT DOCUMENTS

| | | | |
|---|---|---|---|
| 2,949,838 | 8/1960 | Skalabrin | 396/425 |
| 4,496,228 | 1/1985 | Schmidt | 354/293 |
| 4,575,206 | 3/1986 | Maeda et al. | 396/425 |
| 4,640,481 | 2/1987 | Kohno | 248/120 |
| 4,849,778 | 7/1989 | Samuelson | 354/81 |
| 4,907,768 | 3/1990 | Masseron | 248/123.1 |
| 5,192,963 | 3/1993 | Hill | 354/81 |
| 5,275,364 | 1/1994 | Burger | 248/122 |
| 5,281,988 | 1/1994 | Martin | 396/504 X |

*Primary Examiner*—Howard B. Blankenship
*Attorney, Agent, or Firm*—Goldstein & Canino

[57] ABSTRACT

A camera holder, comprising a mast having a proximal end and a distal end, for supporting a camera having a shutter near the distal end. A camera mounting head is located near the distal end, having an upper plate and a lower plate for mounting the camera therebetween. The camera mounting head is attached to the mast with an arm. The arm is adjustable to vary the relative angle of the mast and camera mounting head, and relative distance therebetween. The mast may vary in length by adding additional tubular mast sections. An actuator assembly is located on the upper plate, having a plunger for engaging the shutter of the camera, an actuating lever pivotable on a fulcrum, and wherein an actuation cable is attached to the actuating lever on an opposite side of the fulcrum from the actuating plunger. The actuation cable extends from the proximal end toward the distal end for allowing remote operation of the camera when a user holds the camera holder at the proximal end.

4 Claims, 2 Drawing Sheets

REMOTE PHOTOGRAPHY DEVICE

BACKGROUND OF THE INVENTION

The invention relates to a remote photography device. More particularly, the invention relates to a camera holder which allows attachment of a camera therein, allows the camera to be held a distance from the operator, and allows said operator to actuate said camera to take a photograph therewith.

Certain construction, repair, inspection and maintenance tasks employ photography to record the current state of a device or structure. The photographs may then be used simply for recordation and later comparison with photographs taken at a different time, or may be brought to experts who are better suited for analysis but cannot travel into the field to view the actual subject matter.

However, even the recordation of certain structures and devices is difficult. With regard to highway structures, machinery, and plumbing structures in particular, often very little space is available to allow the photographer to reach the subject matter in order to photograph it. Thus, often the most critical locations remain unphotographed. Thus, attention might only be drawn to a potential problem once it blossoms into a serious problem.

Several devices have been proposed which aid the photographer by holding the camera. However, these devices are all aimed at allowing the camera to be held perfectly still, or for ensuring fluid motion when holding a video camera. None of these devices are well suited for remote photography of hard to reach subject matter.

Fiber optic camera systems are available which allow images to be obtained from hard to reach, and even microscopic locations. Due to the high cost of these systems, there use has been limited generally to the field of medicine.

While these units may be suitable for the particular purpose employed, or for general use, they would not be as suitable for the purposes of the present invention as disclosed hereafter.

SUMMARY OF THE INVENTION

It is an object of the invention to produce a remote photography device, which allows a camera to be used in a location where not enough space is provided to allow the photographer to personally hold and use the camera. Accordingly, the remote photography device employs an adjustable mast which may be extended through a narrow passageway to bring the camera to a location therein.

It is another object of the invention to provide a remote photography device capable of working with existing cameras. Accordingly, a camera mounting head employs an upper and lower plate which is tensioned against the camera to hold said camera rigidly therein.

It is yet another object of the invention that the camera is remotely actuable. Accordingly, an actuating plunger is provided at the upper plate of the camera mounting head, for engaging the shutter button of the camera. The actuating plunger is remotely operated though an actuation cable which extends to the user.

It is a further object of the invention that the camera mounting head is adjustable with respect to the mast. Accordingly an arm is located between the mast and the camera mounting head. The arm allows adjustment both in distance between the mounting head and the mast, and in the angle of the mounting head with respect to the mast.

The invention is a camera holder, comprising a mast having a proximal end and a distal end, for supporting a camera having a shutter near the distal end. A camera mounting head is located near the distal end, having an upper plate and a lower plate for mounting the camera therebetween. The camera mounting head is attached to the mast with an arm. The arm is adjustable to vary the relative angle of the mast and camera mounting head, and relative distance therebetween. The mast may vary in length by adding additional tubular mast sections. An actuator assembly is located on the upper plate, having a plunger for engaging the shutter of the camera, an actuating lever pivotable on a fulcrum, and wherein an actuation cable is attached to the actuating lever on an opposite side of the fulcrum from the actuating plunger. The actuation cable extends from the proximal end toward the distal end for allowing remote operation of the camera when a user holds the camera holder at the proximal end.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
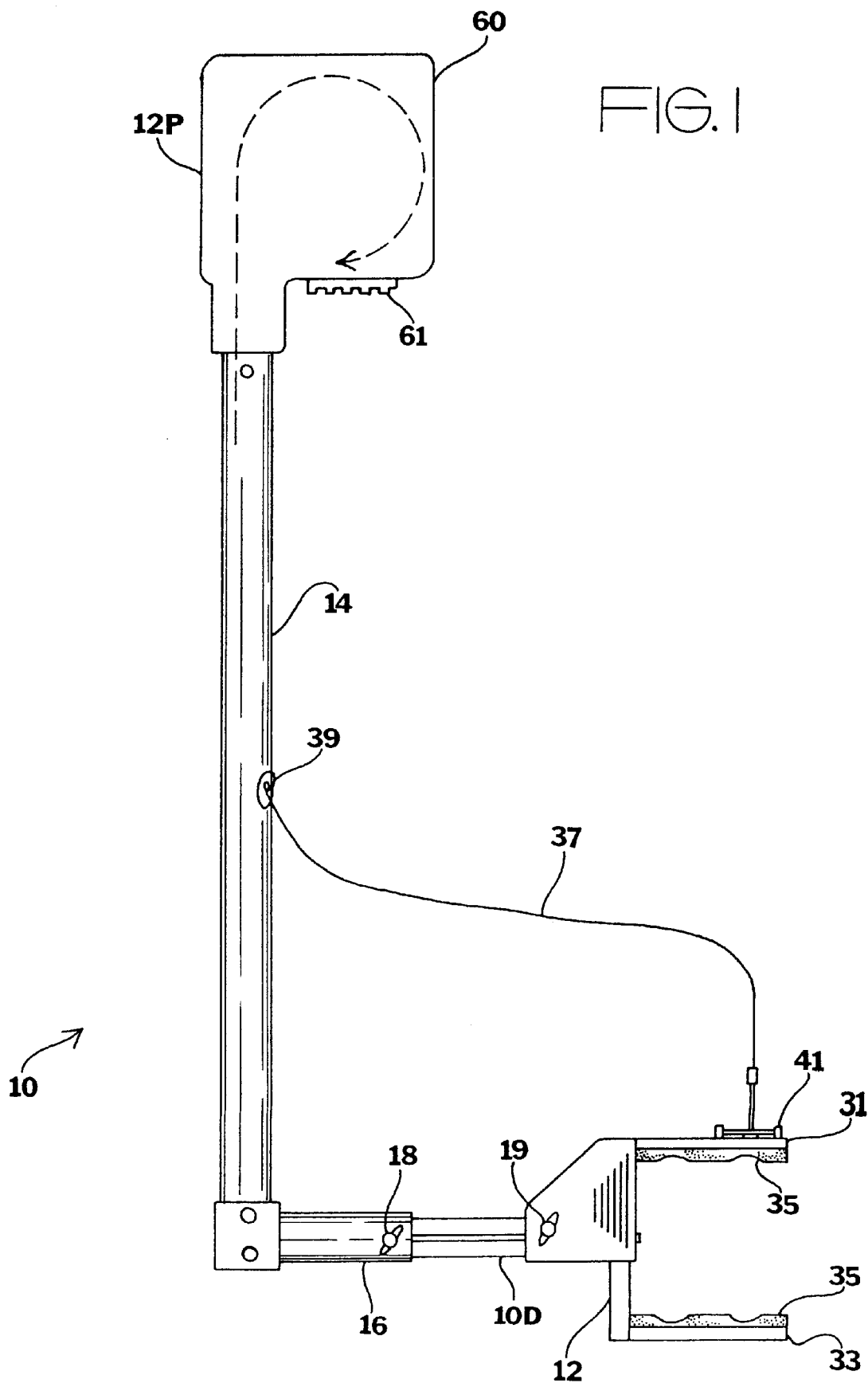
FIG. 1 is a side elevational view, illustrating the camera holder, per se.

FIG. 1 illustrates a camera holder 10. The camera holder has a proximal end 10P and a distal end 10D. The proximal end 10P is typically held by a user. A camera mounting head 12 is located at the distal end 10D. The camera mounting head 12 holds a camera, having a shutter. A mast 14 spans a distance from the proximal end 10P toward the camera mounting head 12. An arm 16 is interposed between the mast 14 and camera mounting head 12.

The arm 16 has a length adjustment assembly 18 for adjusting the relative distance between the camera mounting head 12 and the mast 14. The arm 16 also has a swivel assembly 19 for adjusting the relative angle between the camera mounting head 12 and the mast 14.

The mounting head 12 has an upper plate 31 and a lower plate 33. Camera mounts 35, generally made of rubber, form a bumpy surface which helps hold a camera in places between the upper plate 31 and lower plate 33.

An actuation cable 37 extends through the mast, generally between the proximal and distal ends of the camera holder. The actuation cable 37 exits the mast 14 near the mounting head 12 through an actuation cable orifice 39. An actuator assembly 41 is located at the upper plate 31 of the 25 camera mount 35. The actuator assembly 41 allows the user to trigger the camera shutter remotely by means of the actuation cable 37.

Figure 2:
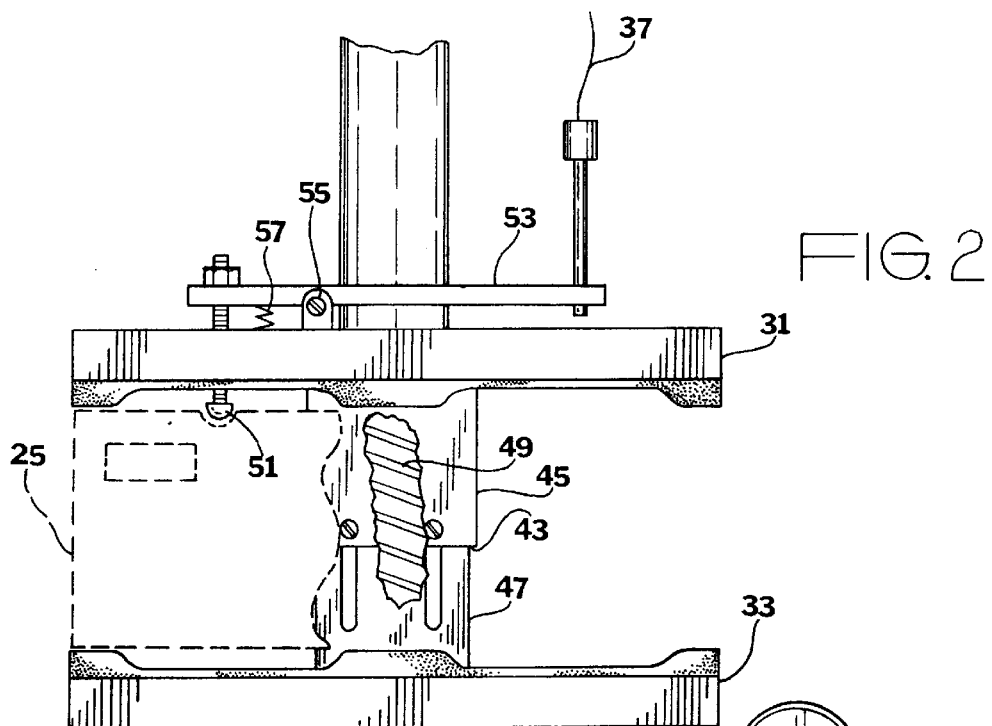
FIG. 2 is a front elevational view, illustrating the camera mounting head, with a portion of the camera illustrated in phantom mounted therein.

Referring now to FIG. 2, the camera 25 is partially shown, depicted in phantom, and mounted between the upper plate 31 and lower plate 33, which are attached with a connecting tube 43. The connecting tube comprises an upper tube 45 and a lower tube 47, which slide within each other for adjusting a distance between the upper plate 31 and lower plate 33. The upper tube 45 is rigidly attached to the upper plate 31, and the lower tube 47 is rigidly attached to the lower plate 33. A coil spring 49 extends between and is fixed to both the upper plate 31 and lower plate 33. The coil spring 49 extends within the connecting tube 43, pulling the upper plate 31 toward the lower plate 33. Thus, once the camera is inserted between the upper plate 31 and lower plate 33, said plates hold the camera tightly therebetween.

The actuator assembly 41 comprises an actuating plunger 51, which extends through the upper plate 31 to make contact with the camera shutter 27. The actuating plunger 51 is attached to the actuation cable 37 with an actuating lever 53 that is pivotable on an actuating fulcrum 55. The actuating plunger 51 and actuation cable 37 are attached to the actuating lever 53 on opposite sides of the fulcrum 55, so that when the actuation cable 37 pulls upward on the actuating lever 53, the plunger 51 is pushed downward upon the camera shutter 27. An actuation spring 57 is located between the actuating lever 53 and the upper plate 31 near the actuating plunger 51 to bias the actuating plunger 51 upward, away from the camera shutter.

Figure 3:
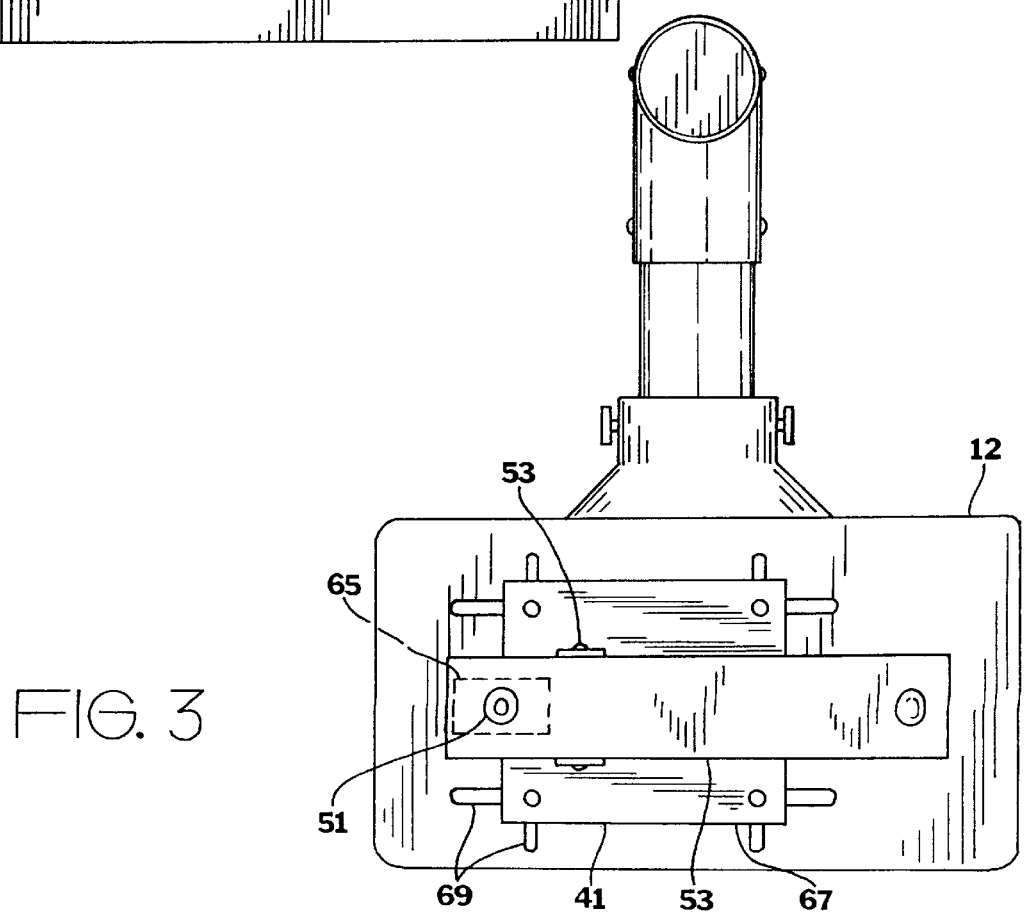
FIG. 3 is a top plan view, illustrating the actuator assembly on the camera mounting head.

FIG. 3 is a top plan view of the camera mounting head 12, illustrating the actuator assembly 41. The actuator assembly 41 is adjustable to vary the location of the actuating plunger on the top plate. Accordingly, the upper plate 31 has a plunger cut-out 65 through which the actuating plunger 51 extends. The actuating plunger 51, actuating lever 53 and fulcrum 55 are all mounted to an actuation assembly carrier 67. The upper plate 31 has carrier adjustment slots 69 which allow the whole actuator assembly to move along the upper plate 31 to allow planar adjustment of the position of the actuating plunger 51, for accommodating different shutter locations on different cameras.

Referring back to FIG. 1, the actuation cable 37 may be stored in a cable reel 60 located at the proximal end of the camera holder 10. The cable reel 60 can function similar to a tape measure, wherein a spring-loaded hub pulls the actuation cable 37 inward for storage. A lock switch 61 fixes the position of the actuation cable 37 with respect to the cable reel 60. Ordinarily, the camera is mounted within the mounting head and the slack is removed from the actuation cable 37, and then the position of the cable is fixed by the lock switch 61. Once the position of the actuation cable 37 has been fixed, a pull upon the cable will cause the plunger to push down upon the shutter to take a photograph.

It is important to note that the mast may be varied in length, by the addition of further tubular mast sections. Each tubular mast section can have male and female threaded ends for easy attachment. Similarly, the cable reel and the arm can have fittings which easily adapt to these threaded ends so that they may attach to the proximal and distal ends of the mast thus formed. In this way, the camera holder can be adapted for different applications where in the camera holder is used to photograph locations relatively close or distant from the user. Further, the precise mechanism for pulling the actuating cable at the proximal end has not been described herein. Many different mechanisms may be employed in conjunction with the cable reel, so that once the mast is fully assembled and the camera is in place, the actuation cable is tensioned so that any further pulling upon the cable will actuate the shutter, and then any such mechanism may be used to produce a slight pull upon the cable in order to take a photograph.

In conclusion, herein is presented a camera holder which allows a camera to be mounted, and held remotely by a user. Once mounted in the camera holder, the user can position the camera in a location where the user would not otherwise be able to personally hold the camera, and take a photograph of said location.

What is claimed is:

1. A camera holder for supporting a camera, held by a user, the camera having a shutter, comprising:

a camera mounting head for securing the camera, comprising an upper plate and a lower plate, the upper plate biased toward the lower plate for holding the camera firmly therebetween;

a mast having a proximal end and a distal end, the proximal end is held by the user, the camera mounting head is located near the distal end;

an actuator assembly, located at the camera mounting head for triggering the shutter of the camera mounted at the mounting head;

an actuation cable, extending from the proximeal end toward the distal end, the actuation cable allowing remote operation the actuator assembly from the proximal end; and an arm, extending between the mast and the camera mounting head, having a length adjustment assembly for adjusting a relative distance between the mast and the camera mounting head, and a swivel assembly for adjusting a relative angle between the mast and camera mounting head.

2. The camera holder as recited in claim 1, wherein the actuator assembly further comprises an actuating lever, pivotable on a fulcrum, an actuating plunger for engaging the shutter, the actuation cable is attached to the actuating lever opposite the fulcrum from the actuating plunger.

3. The camera holder as recited in claim 2, wherein a connecting tube extends between the upper plate and lower plate, a spring within the connecting tube attached to both the upper plate and lower plate biases the upper plate toward the lower plate.

4. The camera holder as recited in claim 3, comprising an actuator carrier, the actuator assembly mounted upon the actuator carrier, the actuator carrier allowing planar movement along the upper plate to position the actuator plunger to match the shutter of the camera being mounted within the camera mounting head.

* * * * *